United States Patent [19]

Dobbs

[11] Patent Number: 4,862,739
[45] Date of Patent: Sep. 5, 1989

[54] WIND TUNNEL MODEL SUPPORT MECHANISM

[75] Inventor: Steven K. Dobbs, Cypress, Calif.

[73] Assignee: Rockwell International Corporation, El Segundo, Calif.

[21] Appl. No.: 207,567

[22] Filed: Jun. 16, 1988

[51] Int. Cl.⁴ .............................................. G01M 9/00
[52] U.S. Cl. ...................................................... 73/147
[58] Field of Search ............................................ 73/147

[56] References Cited

U.S. PATENT DOCUMENTS 2,782,636  2/1957  Peucker ................................. 73/147
2,864,568 12/1958  Ikard et al. ............................ 73/147
2,955,462 10/1960  Holderer ............................... 73/147

Primary Examiner—Donald O. Woodiel
Attorney, Agent, or Firm—Charles T. Silberberg; Harold C. Weston

[57] ABSTRACT

A wind tunnel model support mechanism has a double gimbal arrangement coupled to the tunnel's solid string, allowing the model freedom to move in all three major axes; pitch, roll and yaw with limited movement in horizontal and vertical displacement. Such a support enables evaluation of flutter characteristics not possible during conventional fixed sting operations.

5 Claims, 1 Drawing Sheet

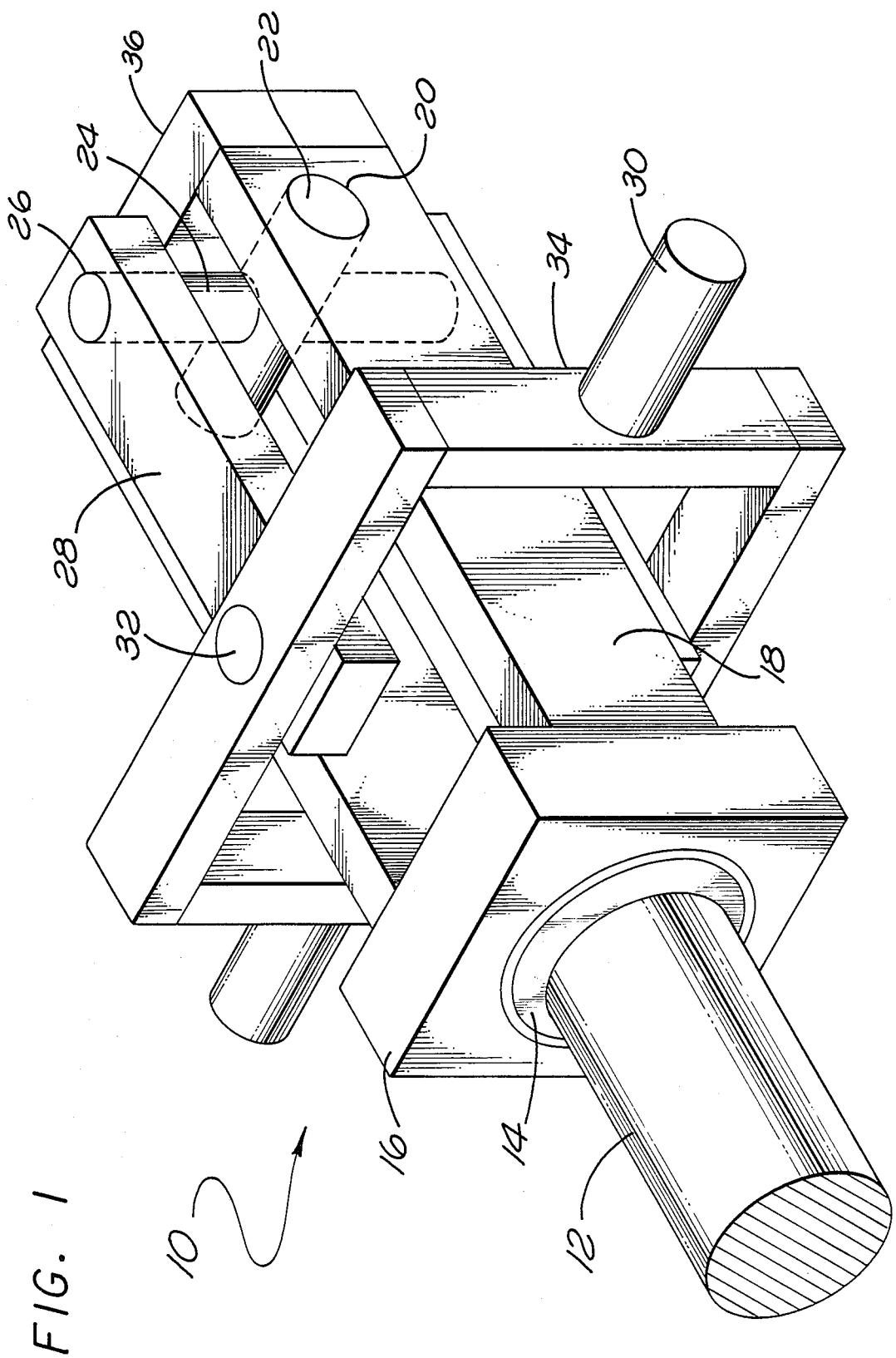

WIND TUNNEL MODEL SUPPORT MECHANISM

ORIGIN OF INVENTION

The invention described herein was made in the course of work on a U.S. Government contract and may be manufactured and used by or for the U.S. Government without payment of royalties therein or therefor.

FIELD OF INVENTION

This invention relates to wind tunnels and more particularly to a means for supporting a test article in a wind tunnel by means of a double gimbal system which allows the test article limited freedom of motion about all three of its major axes and in horizontal and vertical displacement.

BACKGROUND OF THE INVENTION

Studies of aircraft and missile dynamics frequently involve scale model testing in high speed wind tunnels. Conventional testing involves mounting the workpiece (model) on a solid support member ("sting") in the throat of such a tunnel and recording stresses and vibrations experienced as tunnel flow conditions are changed and as the workpiece attitude with respect to that flow is changed. The within invention allows for free flight simulation in the tunnel by providing limited simultaneous pitch, yaw and roll movement during simulated flights. Such freedom includes lateral and vertical motion of the workpiece in the tunnel airstream. Study of vibration of the scale model during transitions is possible in this mode while it is unreliable or impossible in conventional, fixed sting tunnels. This freedom allows more meaningful measurement of flutter characteristics and gust or buffet response than is possible with a fixed sting mounted model.

Wind tunnel studies provide valuable engineering data on various aspects of aircraft design by relating workpiece reactions in the airstream to physical characteristics of the scaled model tested therein. Instrumentation of the workpiece can quite accurately measure such characteristics as sub-critical dynmamic response, flutter conditions, drag and lift, for extrapolation to full sized, free-space craft design and fabrication.

The within invention provides for such measurements while the model is subjected to programmed or commanded attitudes and conditions as opposed to conventional test methods of measuring forces on a fixed or rigidly controlled article. It yields valuable data on vibration modes and flutter characteristics of the airframe not available from fixed sting testing.

PRIOR ART

Conventional wind tunnel testing uses fixed stings to support scaled models in the simulated high speed airstream of the tunnel's test section. Attitude of the workpiece is controlled by positioning of the sting while that sting is rigidly fixed to the workpiece. Pressures, strains and vibrations are measured and later related to model parameters. Such devices as those in U.S. Pat. Nos. 4,658,635 and 4,688,721 to H. Pszolla for a "SIMULATOR FOR AERODYNAMICS INVESTIGATIONS, ETC." and "REAR SUPPORT BALANCE FOR AERODYNAMIC FORCE DETERMINATION, ETC.", and the "STRAIN GAUGE BALANCE" of U.S. Pat. No. 3,233,452 to R. L. Jones, all involve measurement of forces on a wind tunnel workpiece while it is rigidly coupled to its sting.

In this invention, the workpiece is allowed limited freedom in translation, horizontal, vertical, pitch and yaw while coupling to a fixed sting is made through a bearing allowing 360 degrees of freedom about the roll axis.

Instrumentation on the workpiece can be routed through wiring to a commutator/brush system at the rotary bearing, fixed sting portion of the test array or through conventional wire bundles, to external control and recorder instrumentation sets.

SUMMARY OF THE INVENTION

A need exists for a mounting fixture which provides a scale model with pitch, yaw, roll, vertical and horizontal displacement while it is positioned in the test volume of a wind tunnel.

Accordingly, it is an object of this invention to provide a gimballed wind tunnel mounting piece which simulates free flight of a scaled model attached thereto while such model is positioned in the test volume of such wind tunnel.

It is another object of the invention to provide a mounting system for a wind tunnel which provides a tunnel workpiece with limited pitch, yaw, roll, vertical and horizontal displacements while maintaining such workpiece in a controlled airstream simulating volume.

A third object of the invention is to provide a wind tunnel mounting device which allows for study of flutter and sectional vibrations of a scaled aerospace vehicle model attached thereto.

It is yet another object of this invention to enhance aircraft safety by experimentally verifying flutter and instability features of scaled models through special free flight simulating mounting provisions in high speed and transonic wind tunnels.

These and other objects are satisfied by provision of a double gimbal mounting array coupled to a rotary bearing fixed on a stationary sting at the throat of a conventional or high speed wind tunnel. Data from instrumentation on or about the workpiece is passed to systems external to the test volume for recording and analysis.

BRIEF DESCRIPTION OF THE DRAWINGS

1. FIG. 1 is a schematic representation of the gimbaled support mechanism of this invention.

DETAILED DESCRIPTION OF THE INVENTION

FIG. 1 presents a schematic type view of the double gimbal support mechanism of this invention. Descriptor 10 refers to the overall workpiece/model support mechanism which is mechanically attached to the workpiece model through bearings around pitch axle 30. The workpiece is free to rotate around axle 30 within mechanical constraints imposed by the mounting design. For purposes of vibration and flutter studies, only limited travel is necessary and mounting provisions are made inside the workpiece for excursions desired.

The workpiece is held in axial fixity-that is, constrained in motion, only along the roll axis. Sting 12 is based on immoveable structure and holds the workpiece in the air stream through roll bearing 14 seated in structure race 16.

Race 16 is coupled fixedly to primary thrust bars 18. Thrust bars 18 must be rigid enough to support stresses induced by airflow past the workpiece and of such a character as to provide no contribution to workpiece movement by reason of mechanical resonances and unwanted flexure in lateral modes (i.e., vertical and horizontal motion). Support plate 36 helps rigidize thrust bars 18 by closing them around the secondary gimbal set of axles 22 and 24.

Primary thrust bars 18 support bearings 20 for pitch axle 22 of such seconary gimbal set. Bearings 20, set fimly in bars 28, allow secondary thrust bars 28 to rotate about yaw axle 24 which is seated in bearings 26. Bars 28 can rotate through angles limited by motion of primary gimbal ring 34 within the workpiece cavity and by its interference with support bars 18.

There is essentially no movement allowed along the roll axis, although movement of the workpiece about the roll axis is a normal test mode. Secondary gimbal axles 22, 24 in conjunction with model rotations about the pitch axle 30 and the yaw axle 32 are used to allow vertical and horizontal displacement of the workpiece and such use constitutes a major addition to analysis of wind tunnel model performance. Prior to the discovery of such a provision, workpieces could be displaced only through movement of their support stings and no free flight simulation was possible.

Gimbal ring 34 is oriented to a give vertical position to remain free of the primary thrust bars 18 by flying the workpiece at a load factor of one (lift equals model weight). Model control surfaces are actuated and remotely controlled in the same manner as operational vehicles by "trimming" the model to maintain the gimbal ring free of the thrust bars. If the model is improperly trimmed, causing the gimbal ring 34 to contact the thrust bars 18, thus preventing free displacements and rotations, electrical contact switches mounted to ring 34 would close and activate warning lights on the pilot's control panel. These lights, which indicate Gimbal ring contact in either the vertical or horizontal axis, alert the pilot to retrim the workpiece horizontal control surfaces (i.e., elevator) or lateral control surfaces (i.e., rudders) to "fly" the gimbal ring clear of the thrust bars. Horizontal and vertical motion can be free through distances controlled by the movement of primary gimbal ring 34 to primary thrust bars 18. Special design can make such movement adequate for the simulations desired. Pitch axle 30 is fixed in bearings to the workpiece and comprises the only point, or area, of contact between the workpiece and fixed tunnel/test, structure.

Special considerations must be made to allow for proper connection means between pitch axles 30 and mounting bearings of the workpiece fuselage. Centers of mass, pressure, dynamic conderations of a variety of types and the physical stress requirements of tunnel air velocity and turbulence are all test variables that preclude a predetermined attach point of the workpiece to primary gimbal ring 34, prior to establishment of flutter/vibration test objectives.

What is claimed is:

1. A support mechanism for a wind tunnel test article comprising:

primary and secondary gimbals and primary and secondary thrust bars;

said primary and secondary gimbals each having two axles perpendicular to each other and parallel to axles of the other gimbal; said primary gimbal having a frame with said frame coupled to said test article through first rotary bearing means; said secondary gimbal displaced from said primary gimbal along an axis orthogonal to both axles of said gimbals and coupled to said primary gimbal by secondary thrust bars;

said primary thrust bars coupling wind tunnel structure to said secondary gimbal through second rotary bearing means;

said secondary thrust bars coupling said secondary gimbal to said frame of said primary gimbal through third rotary bearing means of said secondary gimbal and fourth rotary bearing means of said primary gimbal.

2. The mechanism of claim 1 wherein said primary thrust bars are coupled to tunnel structure through a structure race allowing rotation of said mechanism about an axis perpendicular to the orthogonal axles of the gimbals.

3. The mechanism of claim 1 wherein the axle through said first bearing means is generally horizontal.

4. The mechanism of claim 1 wherein the primary gimbal frame conforms to the inner shape of a test article.

5. The mechnanism of claim 1 wherein wind tunnel structure comprises a structure race mounted through fifth rotary bearing means to a fixed sting of said wind tunnel.

* * * * *